US009560173B2

(12) United States Patent
Sreeramoju (10) Patent No.: US 9,560,173 B2
(45) Date of Patent: Jan. 31, 2017

(54) TECHNIQUES FOR IMPROVING SYN CACHE PERFORMANCE

(71) Applicant: VMware, Inc., Palo Alto, CA (US)

(72) Inventor: Akshay Kumar Sreeramoju, San Jose, CA (US)

(73) Assignee: VMware, Inc., Palo Alto, CA (US)

(*) Notice: Subject to any disclaimer, the term of this patent is extended or adjusted under 35 U.S.C. 154(b) by 185 days.

(21) Appl. No.: 14/059,783

(22) Filed: Oct. 22, 2013

(65) Prior Publication Data

US 2015/0113152 A1    Apr. 23, 2015

(51) Int. Cl.
*H04L 29/08* (2006.01)
*H04L 29/06* (2006.01)

(52) U.S. Cl.
CPC ......... *H04L 69/163* (2013.01); *H04L 63/1458* (2013.01); *H04L 69/161* (2013.01)

(58) Field of Classification Search
CPC ........ H04L 67/141; H04L 63/00; H04L 63/08; H04L 63/0892
See application file for complete search history.

(56) References Cited

U.S. PATENT DOCUMENTS

| | | | | |
|---|---|---|---|---|
| 2001/0042200 | A1* | 11/2001 | Lamberton et al. | 713/151 |
| 2003/0226032 | A1* | 12/2003 | Robert | H04L 63/1458 726/23 |
| 2005/0198509 | A1* | 9/2005 | Kaniyar et al. | 713/174 |
| 2006/0029000 | A1* | 2/2006 | Waldvogel | H04L 69/16 370/254 |
| 2006/0089994 | A1* | 4/2006 | Hayes | 709/227 |
| 2006/0230129 | A1* | 10/2006 | Swami et al. | 709/223 |
| 2012/0030731 | A1* | 2/2012 | Bhargava et al. | 726/3 |
| 2013/0133045 | A1* | 5/2013 | Hayes et al. | 726/5 |
| 2013/0212165 | A1* | 8/2013 | Vermeulen | G06F 17/30212 709/203 |
| 2014/0150094 | A1* | 5/2014 | Rao et al. | 726/22 |

OTHER PUBLICATIONS

Wesley Eddy, "TCP SYN Flooding Attacks and Common Mitigations", Network Working Group, Request for Comments 4987, Category: Informational, Verizon Federal Network Systems, NASA Glenn Research Center, Aug. 2007, 19 pages.
Jonathan Lemon, "Resisting SYN Flood DoS Attacks with a SYN Cache," viewable at http://people.freebsd.org/~jlemon/papers/syncache.pdf, viewed Oct. 21, 2013, 9 pages.
Wesley Eddy, "Defenses Against TCP SYN Flooding Attacks," The Internet Protocol Journal, vol. 9, No. 4, viewable at http://www.cisco.com/web/about/ac123/ac147/archived_issues/ipj_9-4/syn_flooding_attacks.html, viewed Oct. 21, 2013. 6 pages.

* cited by examiner

*Primary Examiner* — Nicholas Taylor
*Assistant Examiner* — Afroza Sultana (57) ABSTRACT

A computer implemented method receives a client request message to initiate a network connection. In response to the client request, the method generates a key to represent the client request. The key is generated independent of information provided in the client request message and is generated to correspond to a desired address in a data structure used to track client request message. The method then enters the generated key at the desired address in the data structure and transmits a response message that includes the key back to the client. The network connection between the client and the computer system is established according to the key.

20 Claims, 8 Drawing Sheets

Inputs and Result

| Counter | Desired Bucket | Key |
|---|---|---|
| 6 | 0 | 8 |
|  |  |  |
|  |  |  |
|  |  |  |
|  |  |  |

Hash Table

|   | 0 | 1 | 2 |
|---|---|---|---|
| 0 | 8 |   |   |
| 1 |   |   |   |
| 2 |   |   |   |
| 3 |   |   |   |

Inputs and Result

| Counter | Desired Bucket | Key |
|---|---|---|
| 6 | 0 | 8 |
| 14 | 1 | 17 |
|  |  |  |
|  |  |  |
|  |  |  |

Hash Table

|   | 0 | 1 | 2 |
|---|---|---|---|
| 0 | 8 |   |   |
| 1 | 17 |   |   |
| 2 |   |   |   |
| 3 |   |   |   |

Inputs and Result

| Counter | Desired Bucket | Key |
|---------|---------------|-----|
| 6 | 0 | 8 |
| 14 | 1 | 17 |
| 15 | 2 | 18 |
| | | |
| | | |

Hash Table

| | 0 | 1 | 2 |
|---|---|---|---|
| 0 | 8 | | |
| 1 | 17 | | |
| 2 | 18 | | |
| 3 | | | |

Inputs and Result

| Counter | Desired Bucket | Key |
|---------|---------------|-----|
| 6 | 0 | 8 |
| 14 | 1 | 17 |
| 15 | 2 | 18 |
| 23 | 3 | 23 |
| | | |

Hash Table

| | 0 | 1 | 2 |
|---|---|---|---|
| 0 | 8 | | |
| 1 | 17 | | |
| 2 | 18 | | |
| 3 | 23 | | |

Inputs and Result

| Counter | Desired Bucket | Key |
|---|---|---|
| 6 | 0 | 8 |
| 14 | 1 | 17 |
| 15 | 2 | 18 |
| 23 | 3 | 23 |
|  |  |  |

Hash Table

|   | 0 | 1 | 2 |
|---|---|---|---|
| 0 |   |   |   |
| 1 | 17 |   |   |
| 2 | 18 |   |   |
| 3 | 23 |   |   |

Inputs and Result

| Counter | Desired Bucket | Key |
|---|---|---|
| 6 | 0 | 8 |
| 14 | 1 | 17 |
| 15 | 2 | 18 |
| 23 | 3 | 23 |
| 25 | 0 | 28 |

Hash Table

|   | 0 | 1 | 2 |
|---|---|---|---|
| 0 | 28 |   |   |
| 1 | 17 |   |   |
| 2 | 18 |   |   |
| 3 | 23 |   |   |

TECHNIQUES FOR IMPROVING SYN CACHE PERFORMANCE

BACKGROUND

Transmission of data between a client and a server typically begins with the client and server performing a sequence of handshakes to establish a connection. In a Transmission Control Protocol (TCP) handshake, SYN, SYN-ACK, and ACK messages are transmitted between the client and server to establish the connection. The SYN message initiates the communication between the server and client while the SYN-ACK and ACK messages establish the connection. Traditionally, the server generates a TCP control block when a SYN message is received. The SYN message includes synchronization data to synchronize the client with the server. For example, the synchronization data specified by the client. A TCP control block maintains data about a potential connection between a client and server such as the socket numbers, points to buffers, bytes received and acknowledged, etc. The TCP control block is maintained through the duration of the connection and is deleted when the connection ends.

Due to memory limitations of the server, a malicious client can attack a server by using a SYN flood attack. A SYN flood attack is when a malicious client transmits multiple dummy SYN messages to the server. Since each SYN message received generates a TCP control block, the server can run out of memory as it maintains TCP control blocks for these dummy connections. As a result, the server will be unable to service connection requests from legitimate clients.

A SYN cache technique may be a technique to protect against SYN flood attacks. In the SYN cache technique, instead of initially creating a TCP control block for each connection request, the server hashes some or all of the synchronization data to generate a hash value. The hash value is stored in a hash table on the server used to track potential connections with clients. The client and server then engage in further handshake communications to verify the connection using the hash value stored in the hash table to verify the handshake. Once verified, the connection is established and the TCP control block is generated for the established connection. Also, the hash value is deleted from the hash table. Therefore, the TCP control block is generated only for established connections, thus minimizing system resources that would have been wasted from a SYN flood attack.

Because the server generates the hash value using client specific data, the client can possibly control where the server stores the synchronization data in the hash table. This can hinder the performance of the hash table, particularly if the hash keys are places in the same row (i.e., hash bucket) of the hash table. For example, each hash bucket may contain a limited number of entries for connection requests. Once the hash bucket is filled with hash values, the server cannot service any additional SYN messages directed to that hash bucket without deleting existing entries in the hash table. This may cause performance problems as the server may drop legitimate connection requests. Thus, a malicious client may attempt to fill the same hash bucket of the hash table by specifying client specific data used by the server to determine where to store the hash value in the hash table.

SUMMARY

In one embodiment, a computer implemented method receives a client request message to initiate a network connection. The method further generates a key to represent the client request message where the key is generated independent of information provided in the client request message. Once the key is generated, the method then enters the key into a hash table. The method then transmits a response message in response to the client request message. The response message includes the generated key.

The following detailed description and accompanying drawings provide a more detailed understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, make apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

In one embodiment, countermeasure techniques are described for reducing the effect of network attacks, such as SYN flood attacks. One technique involves the use of a data structure configured to store a synchronization key for each half opened network connection. In a TCP handshake scenario, the server may half open a network connection when the server receives the SYN message, but has yet to receive a subsequent ACK message from the client. Traditionally when a network connection is half opened, the server creates a TCP control block, which is approximately 1000 bytes. However, in particular embodiments, the server creates and stores a synchronization key where the synchronization key is smaller than the TCP control block (e.g., approximately 100 bytes instead of 1000 bytes of TCP control block). By storing a synchronization key for half opened network connections in the data structure rather than storing TCP control blocks, the amount of system resources that is consumed by half opened network connections is minimized due to the size of the synchronization key being smaller. After storing the synchronization key in the data structure, the server transmits the synchronization key to the client in the SYN-ACK message. In one example, the server transmits the synchronization key as a server initial sequence number that is generated independently of client information provided by the client. When the server receives an ACK message that contains the same synchronization key, the server verifies the synchronization key and then generates the TCP control block to establish the connection. Accordingly, because the server generates the TCP control block after verifying the synchronization key, an attack that sends SYN messages in which an ACK message may never be received uses less computing resources and storage because the synchronization key is smaller than the TCP control block and is less complicated to compute.

Particular embodiments improve use of the data structure by having the server generate the synchronization key for the data structure independently from the client without using information from the SYN message received from the client or any client-specific information. This can remove the client's ability to manipulate the key generation process, thus preventing a malicious client from creating targeted attacks on the server. Further, the server can improve the spatial usage of the data structure because the server can control where to enter the synchronization key in the data structure. Thus, a malicious client cannot repeatedly target a hash bucket of the data structure in an attempt to cause the server to drop messages.

While the discussion here will be targeted to a network connection using the TCP protocol, it is to be understood by one of skill in the art that the techniques described herein are also applicable to network connections using other network protocols. Therefore, SYN message is synonymous with any client request message to initiate a network connection, SYN-ACK message is synonymous with any server response message to the client request message, and ACK message is synonymous with any client acknowledgment message to the server response message. Furthermore, the techniques are not only applicable to client-server embodiments but also to client-client and server-server embodiments.

Figure 1:
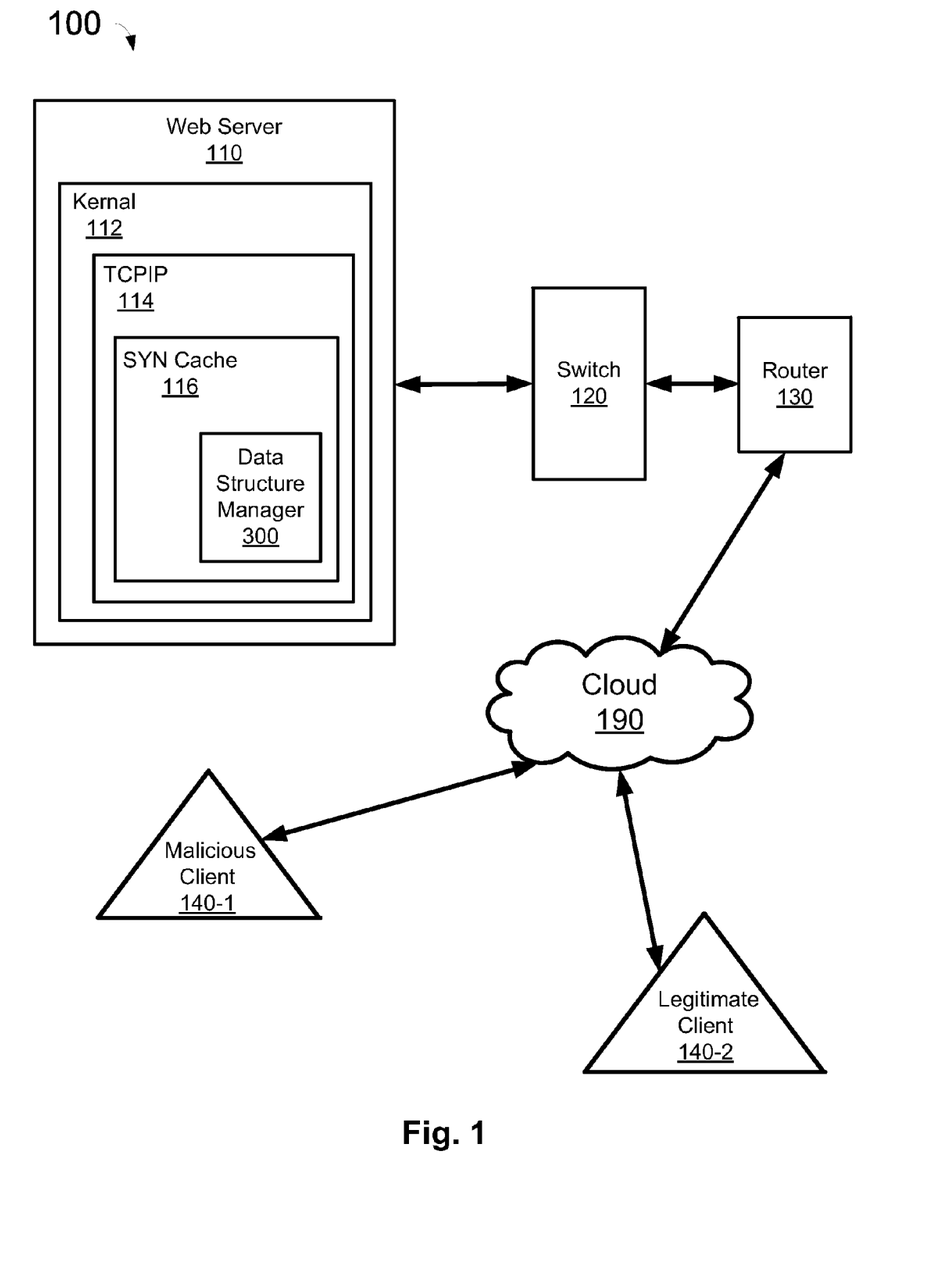
FIG. 1 depicts an example of a system for initializing connections between a server and a client according to one embodiment.

FIG. 1 depicts an example of system 100 for initializing connections between a server and a client according to one embodiment. As shown, system 100 includes web server 110 that processes connection requests from clients that include a malicious client 140-1 and a legitimate client 140-2. Web server 110 cannot distinguish the nature of connection requests by malicious client 140-1 from connection requests by legitimate client 140-2. Clients 140 send client request messages (e.g., SYN messages) to initiate a network connection with web server 110 through cloud 190, router 130, and switch 120. Web server 110 receives the client request messages, processes the client request messages, and transmits a server response message (e.g., SYN-ACK message) for each client request message received. The server response messages can be transmitted back to their respective clients using the same communication path of switch 120, router 130, and cloud 190. At this point, the network connections are half opened awaiting the client to acknowledge the server response message to establish the connection. In some embodiments, malicious client 140-1 can leave these network connections half opened to waste server resources.

Web server 110 includes kernel 112 which runs a TCP Internet Protocol (TCPIP) manager 114. TCPIP manager 114 manages network communication between web server 110 and clients on a network protocol, such as the TCPIP protocol. In other embodiments, web server 110 can include other network managers configured to manage network communication over other network communication protocols.

TCPIP manager 114 includes a SYN data structure manager 116 that processes incoming client request messages and caches half opened network connections. The half opened network connections can remain cached in a data structure until an acknowledgment message is subsequently received from legitimate client 140-2 to establish the connection. In one embodiment, SYN data structure manager 116 can delay the generation of the TCP control block for a given network communication request until the connection is established in order to reduce server resources spent on generating TCP control blocks for half opened network connections. As a result, the strain on server resources caused by dummy SYN messages is minimized. That is, server 110 saves computing resources by not generating TCP control blocks for half opened network connections that malicious clients 140-1 may be requesting. In one embodiment, SYN data structure manager 116 can delete an old half opened network connection from the data structure to make room for a new network connection when the data structure is full. In another embodiment, SYN data structure manager 116 can reject new network connection requests when the data structure is full.

SYN data structure manager 116 includes a data structure manager 300. Data structure manager 300 generates a synchronization key for a half opened network connection. The synchronization key, which represents a client request, may be information that corresponds to a row or hash bucket of the data structure. In one embodiment, the synchronization key, when hashed, can identify a row in a hash table. In the discussion, a hash function and hash table will be discussed, but it will be understood that other functions and data structures may be used. In one embodiment, data structure manager 300 uses a function to generate the synchronization key. Data structure 300 then stores the synchronization key in a row of a hash table. A row of a hash table can be indexed by an address and can store multiple synchronization keys. Thus, all the synchronization keys that are in a row are said to belong in a hash bucket. When SYN data structure manager 116 performs a hash function on the synchronization key, the row of the hash table that stores the synchronization key is identified.

In one embodiment, the synchronization key can be a server initial sequence number that is transmitted to the client for purposes of establishing the network connection. The server initial sequence number may be a number that may increment upon each generation (with the exception of a resetting of the number). In one example, the client can respond with an acknowledgement number that would be one plus the initial sequence number sent by web server 110. Web server 110 receives the acknowledgement number and is cognizant of the client incrementing the initial sequence number. As a result, web server 110 can determine the server initial sequence number that was initially transmitted to the client as the synchronization key. In another example, the client can respond with an acknowledgement number that is the initial sequence number set by web browser 110 and web browser 110 can validate the connection based on the initial sequence number. SYN data structure manager 116 can determine if the server initial sequence number that was initially transmitted is located in the hash table. If SYN data structure manager 116 finds the server initial sequence number in the hash table, SYN data structure manager 116 can notify TCPIP 114 to establish the network connection. SYN data structure manager 116 can then clear the server initial sequence number from the hash table, thus making room for another client request.

Server 110 uses the hash table to determine when to accept connections from clients 140. For example, a hash bucket may have limited entries and when a hash bucket (e.g., a row) of the hash table is full, server 110 cannot accept another connection request that maps to that hash bucket. In this case, server 110 refuses to open the connection request (e.g., drops the request). Conventionally, malicious clients 140-1 exploited this vulnerability by sending connection requests that targeted a hash bucket of the hash table. Once the malicious requests have caused a hash bucket to fill up, legitimate requests from clients 140-2 that map to the same bucket are dropped by server 110.

In various embodiments, data structure manager 300 can implement one or more techniques to improve the security and performance of SYN data structure manager 116. For example, data structure manager 300 may spatially distribute storing synchronization keys in the hash table to optimize the distribution. Because data structure manager 300 does not use information from client 140 to determine where to store the key, this allows data structure manager 300 to control the process and spatially distribute the keys in a controlled manner without client direction. In one embodiment, data structure manager 300 fills the hash table in a predefined order that improves the performance of the hash table. For example, entries that correspond to client requests can be equally distributed in hash buckets of the hash table. The balanced distribution can lead to faster search times and better utilization of the hash table. The balanced distribution also prevents a malicious client from attacking web server 110 by attempting to manipulate the generation of synchronization keys such that the keys are all entered in the same hash bucket of the hash table. In another embodiment, data structure manager 300 can generate keys that are randomized, unique, and/or increasing in value. In one example, the randomness can be on a per network connection request, thus making it difficult for a malicious client to predict. These attributes can make it more difficult for a malicious client to predict the algorithm used to generate the key. These improvements are discussed in further detail below.

Figure 2:
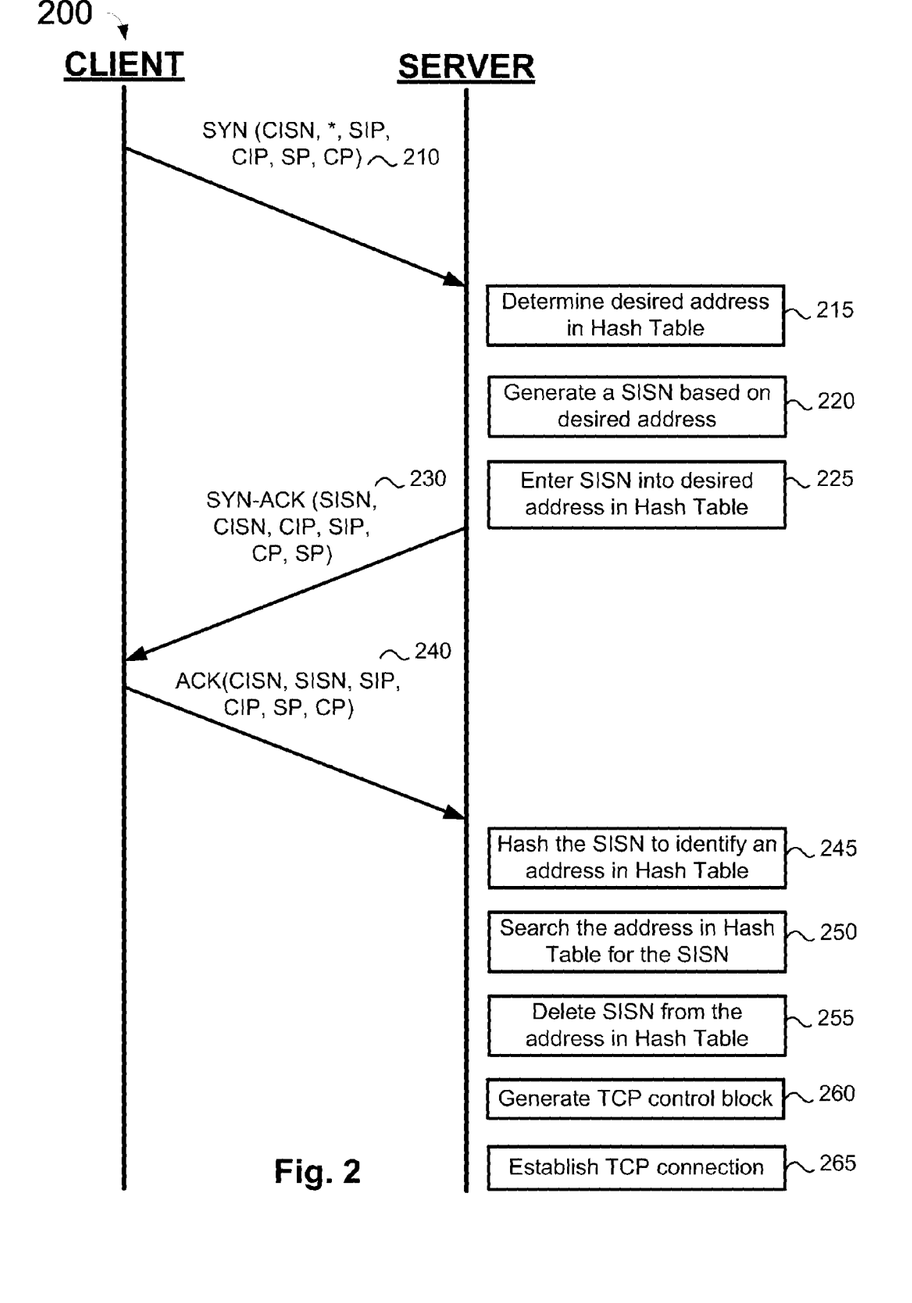
FIG. 2 depicts an example of establishing a TCP network connection between a client and a server according to one embodiment.

FIG. 2 depicts an example of establishing a TCP network connection between client 140 (e.g., either client 140-1 or 140-2) and server 110 according to one embodiment. Network connection 200 begins with client 140 transmitting a SYN message to server 110 at 210. In one example, the SYN message includes a client initial sequence number (CISN), server Internet Protocol Address (SIP), client Internet Protocol Address (CIP), server port identifier (SP), and client port identifier (CP). Client 140 initial sequence number can specify the initial sequence number that is used by client 140 when transmitting data to server 110 when the network connection is established. Client 140 transmits data to server 110 using multiple packets. Each packet can contain a certain number of bytes. As client 140 transmits each packet to server 110, client 140 increments the client sequence number in the following packet by the number of bytes in the previous packet. This allows server 110 to organize the packets received according to the order they were sent (and not received), which compensates for any delays that each packet experiences. The SIP, CIP, SP, and CP specify the physical and logical destinations for server 110 and client 140. As shown the server initial sequence number (SISN) is set to "*" in the SYN message since server 110 has not specified an initial sequence number.

Once server 110 receives the SYN message, server 110 determines a desired address in the hash table to store an SISN (e.g., the synchronization key) associated with the client request at 215. The desired address is an index in a hash table. The index identifies a row of the hash table, also known as a hash bucket. In one example, server 110 can determine a desired address for the SISN that would result in a balanced distribution of SISNs in the hash table. This can improve the seek times and optimize the storage of SISNs in the hash table. Also, server 110 determines the desired address independent of client information. For example, conventionally, the server used client information provided in the SYN message, such as the CIP, SIP, CP, and SP. Although the client information may refer to information received in the SYN message, the client information can also include information that is stored on server 110 or that server 110 has access to that is related to client 140.

Once a desired address is determined, server 110 generates a SISN for the client request based on the desired address. Server 110 can generate the SISN in a manner such that when the SISN is hashed using a hash function, the desired address is returned. This allows the server to locate the SISN in the hash table by simply hashing the SISN rather than requiring a separate key. In one example, server 110 generates the SISN independent of client information. This can prevent a malicious client from manipulating the SISN. In another example, server 110 generates an SISN that is randomized to prevent a malicious client from predicting future SISNs. The randomization can be on a per connection basis so that the randomization is not consistent across the network connection requests. This can prevent a malicious client from predicting the SISN and generating dummy ACK messages to confuse the server. The generation of the SISN is discussed in further detail in FIG. 3.

Once the SISN is generated, server 110 enters the SISN into the hash table at 225. For example, the SISN can be entered into the desired address of the hash table. In one example, server 110 can validate the SISN by determining whether hashing the SISN results in the desired address. This can be performed as a verification step prior to storing the SISN in the desired address.

Once server 110 enters the SISN into the hash table, server 110 can transmit a SYN-ACK message to client 140 at 230. The SYN-ACK message can include the same connection parameters as in the SYN message except that the SYN-ACK message also has a specified SISN. Server 110 transmits the SISN to client 140 so that client 140 can piece together packets received from server 110. The SISN also serves as the key to establish the network connection.

Once the SYN-ACK message has been transmitted to client 140, server 110 waits until it receives an ACK message from client 140 at 240. The ACK message can include the SISN previously sent by server 110. Server 110 determines the SISN from the ACK message and hashes the SISN to identify an address in the hash table at 245. Server 110 then searches a hash bucket (e.g., row of the hash table) that corresponds to the address to locate the SISN at 250. If the SISN is found, server 110 deletes the SISN from the hash table at 255. Server 110 then generates the TCP control block at 260 and establishes the TCP connection at 265. If server 110 does not find the SISN in the hash table, then server 110 performs a remedial action for the ACK message, such as determining the ACK message is malicious in nature and server 110 deletes the ACK message.

Figure 3:
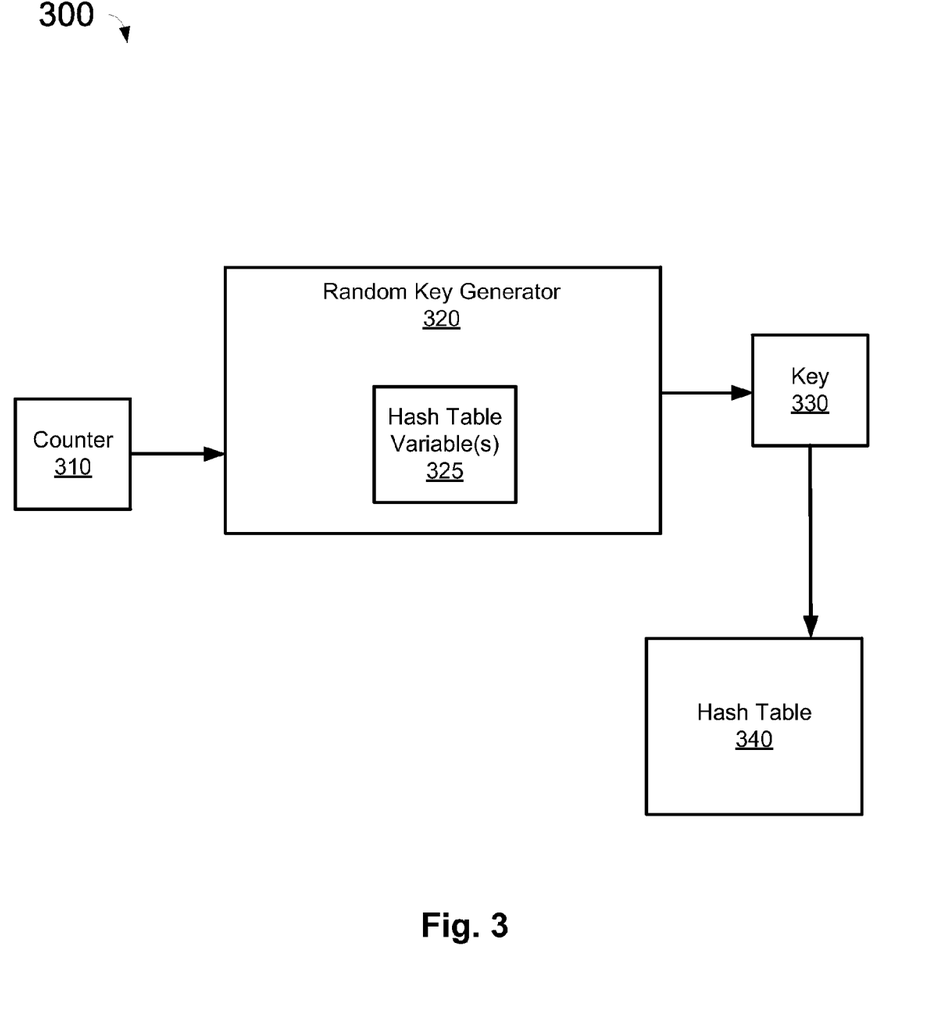
FIG. 3 depicts an example of a data structure manager according to one embodiment.

FIG. 3 depicts an example of data structure manager 300 according to one embodiment. Data structure manager 300 caches half opened network connections in hash table 340. More specifically, data structure manager 300 generates a synchronization key corresponding to a half opened network connection and stores the synchronization key in hash table 340. In one example, the key can also serve as the SISN that server 110 transmits to client 140 in a SYN-ACK message.

In one method of generating keys, data structure manager 300 includes random key generator 320 that generates a synchronization key 330 according to a received value from counter 310 and a value from stored hash table variables 325. In one embodiment, the generated key is random and monotonously growing. In one example, counter 310 can be from a system clock or other clock belonging to server 110. Also, hash table variables 325 can include a bucket count that specifies the total number of rows (i.e., total number of addresses) within hash table 340 and/or a desired address of the hash table (i.e., desired bucket) to store the current or next half opened network connection. Hash table variables 325 can remain consistent through the life of data structure manager 300 so that the synchronization key generated during the life of data structure manager 300 are based on the same set of rules. This can allow the generated synchronization keys to match up with what is received from the client.

In some embodiments, random key generator 320 can generate synchronization key 330 according to one or more of the following combination of requirements:

The synchronization key is randomized for each client connection request.
The synchronization key is generated independent of client information.
The synchronization key provides a balanced spatial distribution when entered into the hash table.
Each subsequently generated synchronization key is unique and increasing in value.

In one embodiment, random key generator 320 can include an equation that is configured to generate synchronization keys that meet the specified requirements. In another embodiment, random key generator 320 can generate a synchronization key according to one or more requirements that are described using one or more rules.

FIGS. 4A-4F depict an example of random key generator 320 generating synchronization keys and entering the generated synchronization keys into hash table 340 according to one embodiment. When random key generator 320 generates a synchronization key, the synchronization key corresponds to a row or hash bucket. That is, a synchronization key may correspond to the row with the value of "1" in the hash table. That row contains a number of entries (e.g., 0, 1, and 2) in which data structure manager 300 can fill with key values corresponding to the half opened connections. Once a hash bucket is full (e.g., for the row 1, key values are located in the columns 0, 1, and 2), server 110 cannot accept any more connection requests that are associated with a synchronization key that hashes to the row. Conventionally, malicious client 140-1 may have targeted a hash bucket, such as row 1, and filled entries in columns for the row. Malicious client 140-1 was able to target the hash bucket because server 110 used information specified by the client to determine the hash bucket and malicious client 140-1 tried to predict the information needed to target the hash bucket.

In this embodiment, random key generator 320 can generate a synchronization key using an equation that can spatially distribute synchronization keys in a manner desired by server 110. For example, instead of filling up a single hash bucket, random key generator 320 generates synchronization keys that, when hashed, fill up different hash buckets (e.g., different rows of the hash table). In one embodiment, random key generator 320 uses an equation listed below:

Synchronization Key=Counter+[[#_of_Buckets+Desired_Bucket−(Counter%#_of_Buckets)]%#_of_Buckets], where counter is a counter value, # of Buckets is the number of buckets in the hash table, and Desired_Bucket is a desired bucket. The counter may be a counter value from a counter within server 110. The number of buckets can be a hash table variable stored within random key generator 320. The desired bucket can be the address within the hash table that server 110 would like the generated synchronization key to be stored in. The desired bucket is used to improve the spatial distribution in the hash table or some other desire of server 110. The number of buckets may be the number of rows in the hash table. When the synchronization key is hashed by the hash function, a desired bucket (i.e., desired address) is returned.

In the equation shown above, the synchronization key can be generated by adding a randomized value to a counter value. The randomized value, which is generated by calculating [[#_of_Buckets+Desired_Bucket−(Counter % #_of_Buckets)]% #_of_Buckets], can serve two purposes. For one, adding the randomized value to the counter can ensure that the generated synchronization key, when entered into hash table 340, is entered in the desired hash bucket. As discussed above, hashing the synchronization key identifies the hash bucket that stores the synchronization key. If the synchronization key was purely based on the counter value, then there is no guarantee that hashing counter values will result in a balanced spatial distribution of synchronization keys in the hash table. Most likely the distribution will not be balanced. Thus by supplementing the counter value with a randomized value based on the desired bucket variable, server 110 can control where in the hash table that the synchronization key would be stored. Secondly, adding a randomized value to the counter results in a randomized key. By randomizing the key, it is more difficult for a malicious client to determine the synchronization keys that are generated by server 110. A malicious client that knows the synchronization keys may attempt to confuse the server with dummy ACK messages.

Furthermore, in one embodiment, the address of hash table 340 to store the synchronization key may be based on the synchronization key. For example, data structure manager 300 uses the hash function listed below to determine the hash bucket:

Address of Hash Table=Synchronization Key % #_of_Buckets

As shown above, the remainder when the key is divided by the number of buckets in the hash table is used to determine an address of a hash table. Taking the remainder of the key determines one of the hash bucket values of 0-4. That is, a key value of 14 corresponds to the address of 14/4=remainder 2 (e.g., row 2). Data structure manager 300 then inserts the value of the key in the hash bucket corresponding to row 2 in the hash table.

Figure 4A:
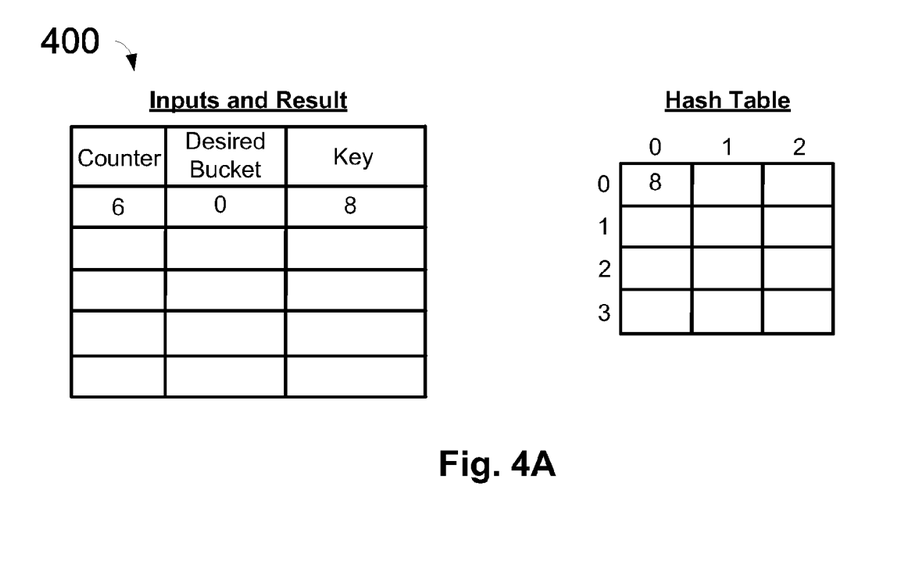
FIGS. 4A-4F depict an example of a random key generator generating synchronization keys and entering the generated synchronization keys into a hash table according to one embodiment.

The following will now describe a method that server 110 uses to input keys into the hash table. Referring to FIG. 4A, when server 110 receives a client request to initiate a network connection, random key generator 320 receives a counter value of 6 and retrieves the value 0 from the desired bucket variable (signifying that the generated synchronization key should be entered in index 0 of the hash table) and the number 4 from the buckets in the hash table variable. Here the desired bucket variable is initially set to zero but in other embodiments it can be initialized to any row in the hash table. The counter value represents a current count of the counter. The number of buckets is 4 because there are 4 rows in the hash table for entering SISNs for half open connections. In this embodiment, random key generator 320 stores a value for the desired bucket variable and another value for the number of buckets variable. Every time a synchronization key is generated, the desired bucket variable is updated. Although only one value is being stored for the desired bucket variable, all the values are being presented in FIGS. 4A-4F for illustrative purposes.

Random key generator 320 can process the counter value, desired bucket variable, and number of buckets variable according to the equation above to generate the synchronization key. First, random key generator 320 calculates (Counter % #_of_Buckets) where the remainder of the counter value (e.g., 6) divided by the number of buckets variable (e.g., 4) is the value 2 (e.g., 6/4=remainder 2). Then, random key generator 320 calculates [[#_of_Buckets+Desired_Bucket−(Counter % #_of_Buckets)] where value 2 is then subtracted from the number of buckets variable (e.g., 4) plus the desired bucket variable (e.g., 0), resulting in the value 2 (4−(2+0)=2). Random key generator 320 then calculates [[#_of_Buckets+Desired_Bucket−(Counter % #_of_Buckets)]% #_of_Buckets] where the remainder of the value 2 divided by the number of buckets variable (e.g., 4) results in the value 2 (e.g., 4+0−2=2). Thus, the value 2 is added to the counter value (e.g., 6) to generate the key value of 8 (6+2=8). The generated synchronization key value of 8 can be entered into the desired bucket (e.g., 0) in the hash table. That is, the address is 8/4=remainder 0. After entering the generated synchronization key into the hash table, the desired bucket variable is incremented to the next bucket in the hash table (e.g., from 0 to 1), circling back to the first bucket (e.g., row zero) when the last bucket (e.g., row 3) has been reached. In some embodiments, server 110 transmits the generated synchronization key to client 140 as the SISN.

Figure 4B:
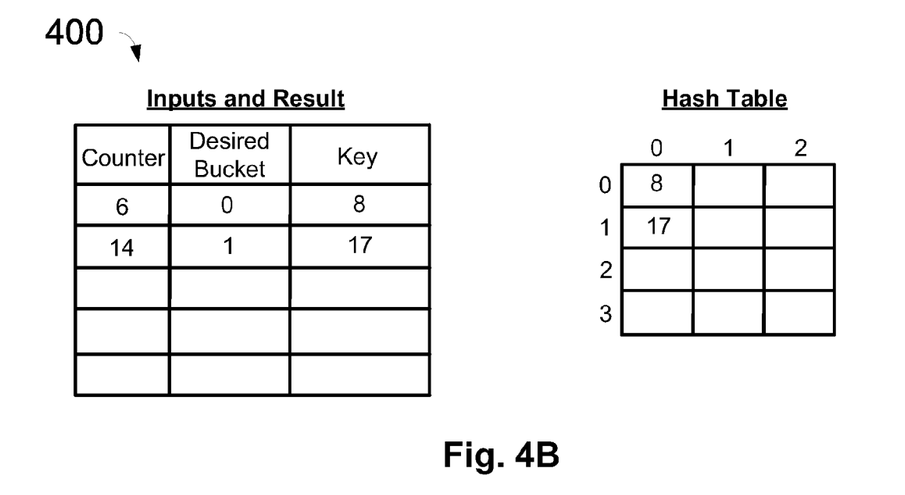

In FIG. 4B, server 110 receives another client request to initiate a network connection. Random key generator 320 receives a counter value of 14 and retrieves the value 1 from the desired bucket variable. It is assumed that the number of buckets variable remains consistent at the value 4 so long as the number of buckets in the hash table does not change for this example. Random key generator 320 can process the counter value, desired bucket variable, and number of buckets variable according to the equation above to generate the synchronization key. Here, synchronization key value of 17 is generated from the desired bucket value of 1 and the counter value of 14. The generated synchronization key value of 17 can be entered into the desired bucket (e.g., 1) in the hash table. That is, the address is 17/4=remainder 1. As shown, data structure manager 300 entered the synchronization key into the hash bucket corresponding to row 1. Thus, data structure manager 300 has spatially distributed two synchronization keys for two connection requests in different hash buckets. After entering the generated synchronization key into the hash table, the desired bucket can be incremented.

Figure 4C:
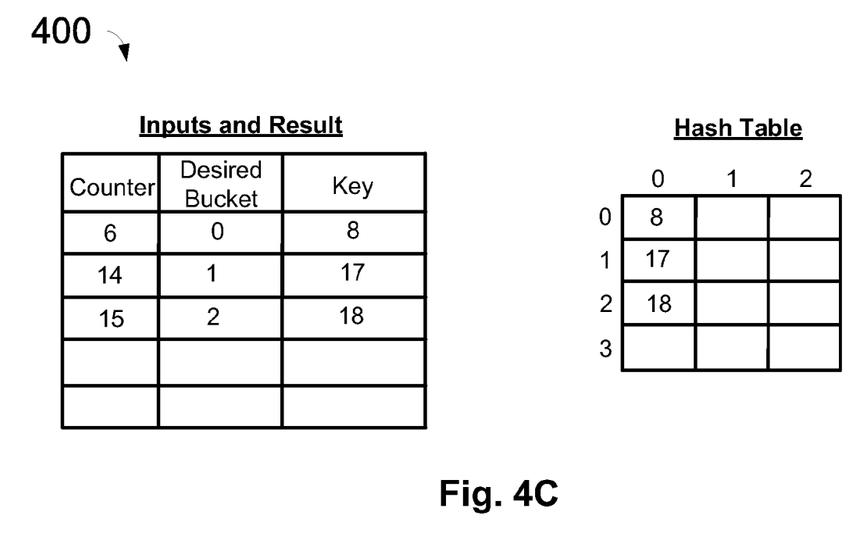
Figure 4D:
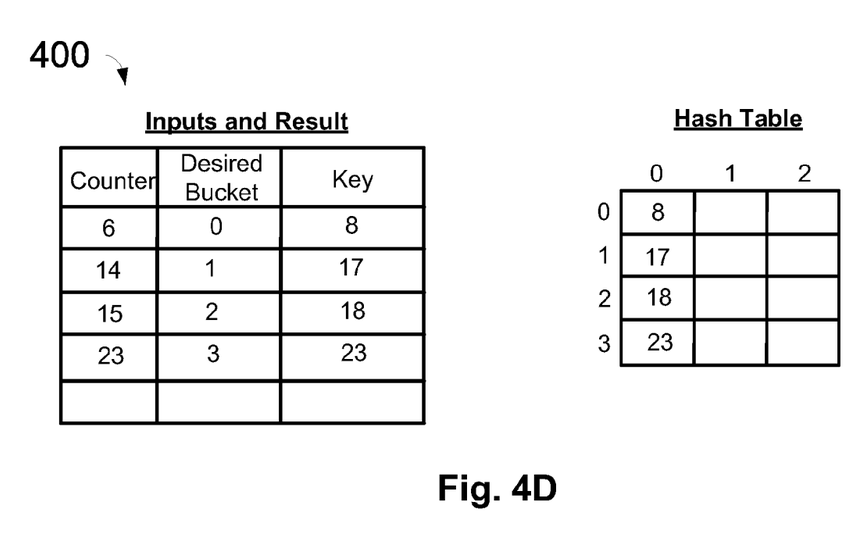

In FIG. 4C, server 110 receives another client request to initiate a network connection. Random key generator 320 receives a counter value of 15 and retrieves the value 2 from the desired bucket variable. In response to those input values, random key generator 320 generates synchronization key value 18. Key 18 is entered into desired bucket 2 of the hash table. Similarly in FIG. 4D, server 110 receives another client request to initiate a network connection. Random key generator 320 receives a counter value of 23 and retrieves the value 3 from the desired bucket variable. The generated synchronization key value of 23 can be entered into the desired bucket (e.g., 3) in the hash table and the desired bucket can be incremented. Here, the desired bucket variable has a value 3 which is the last bucket in the hash table. Incrementing past the last bucket of the hash table resets the desired bucket variable to the first bucket of the hash table (e.g., row 0). Thus, the desired bucket has been incremented to the value 0. As shown, the random number that is added to the counter to generate the synchronization key fluctuates for each key. Key 8 had the value 2 added to the counter, key 17 had the value 3 added to the counter, key 18 had the value 3 added to the counter, and key 23 had the value 0 added to the counter. Moreover, the synchronization keys are being generated and stored in a column by column fashion where the first column of the hash table (e.g. column 0) is being filled before storing synchronization keys in the second column.

Figure 4E:
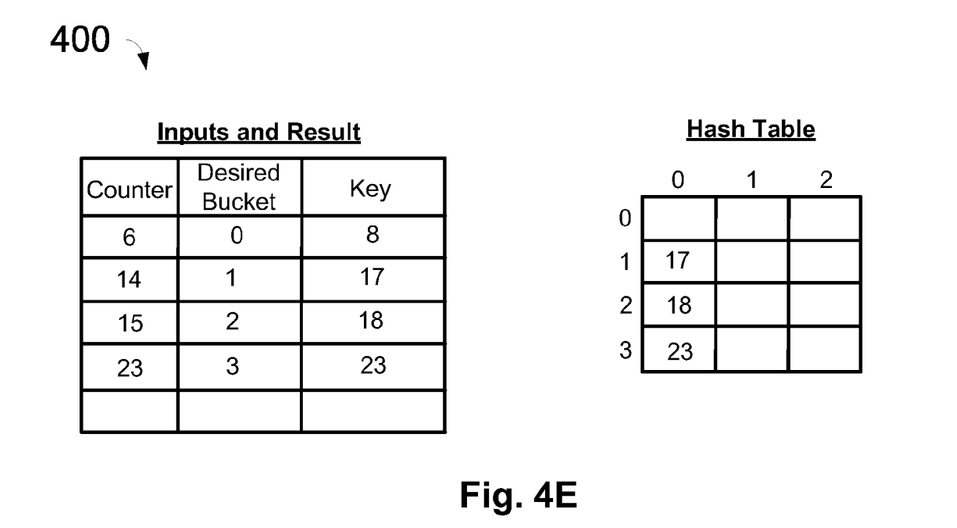

In FIG. 4E, server 110 receives a client acknowledgement message that contains the synchronization key value 8. In one example, the acknowledgment message is an ACK message and the synchronization key value is the SISN in the ACK message. SYN data structure manager 116 of server 110 can hash the synchronization key value according to the hash function above, resulting in the value 0. SYN data structure manager 116 finds the hash bucket associated with index 0 and retrieves the synchronization key value 8 from the hash bucket. Here, the synchronization key value 8 is found in hash bucket 0 of the hash table. After retrieving the value, SYN data structure manager 116 clears the value from the hash table. As shown, the value at the (0, 0) hash bucket does not include a value. Server 110 then establishes a network connection with client 140.

Figure 4F:
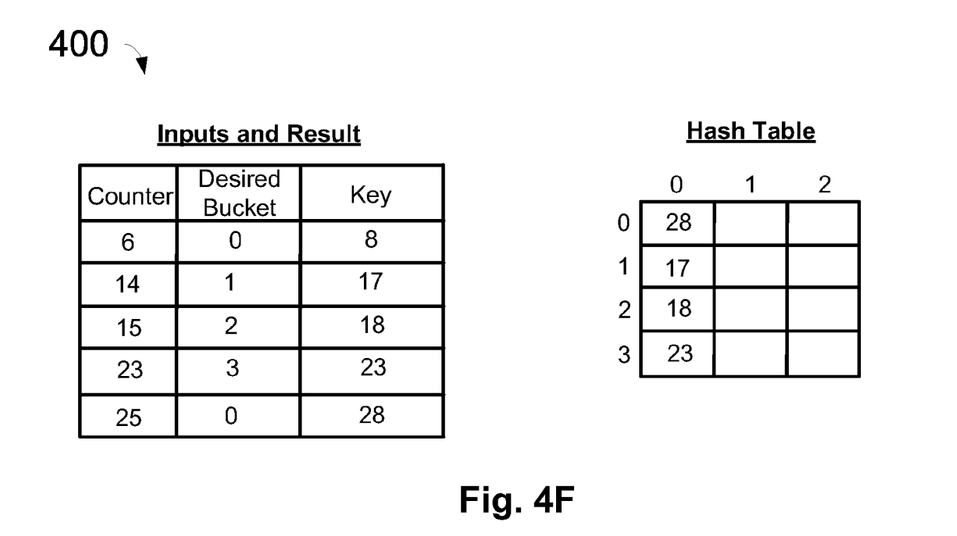

In FIG. 4F, server 110 receives another client request to initiate a network connection. Random key generator 320 receives a counter value of 25 and retrieves the value 0 from the desired bucket variable. The generated synchronization key value of 28 can be entered into the desired bucket (e.g., 0) in the hash table. After entering the generated synchronization key into the hash table, the desired bucket can be incremented from 0 to 1. When the next connection request is received, the synchronization key will be entered into the (1,1) entry of the hash table because the (1,0) entry is already full. As shown, the hash table maintains a balanced spatial distribution as new synchronization keys are generated and stored in the hash table. By iterating through the hash buckets to store the synchronization keys, the synchronization keys are being evenly distributed throughout the hash table and therefore stored in an optimal fashion.

While an equation was used in this embodiment to generate the synchronization key, random key generator 320 can also be configured to generate the synchronization key using other techniques. In one embodiment, random key generator 320 can generate a synchronization key according to a set of rules. For example, a first rule can specify that the generated synchronization key must be incrementally larger than the previously generated synchronization key. In other words the keys become increasingly larger. A second rule can specify that the generated synchronization key must be larger than the counter value. A third rule can specify that the generated synchronization key is to be stored in the hash bucket having the fewest number of stored synchronization keys. These rules may store values in the hash table to achieve the same result when using the equation to determine where to store the synchronization key. Other rules can be combined to these existing rules to generate the synchronization key.

Figure 5:
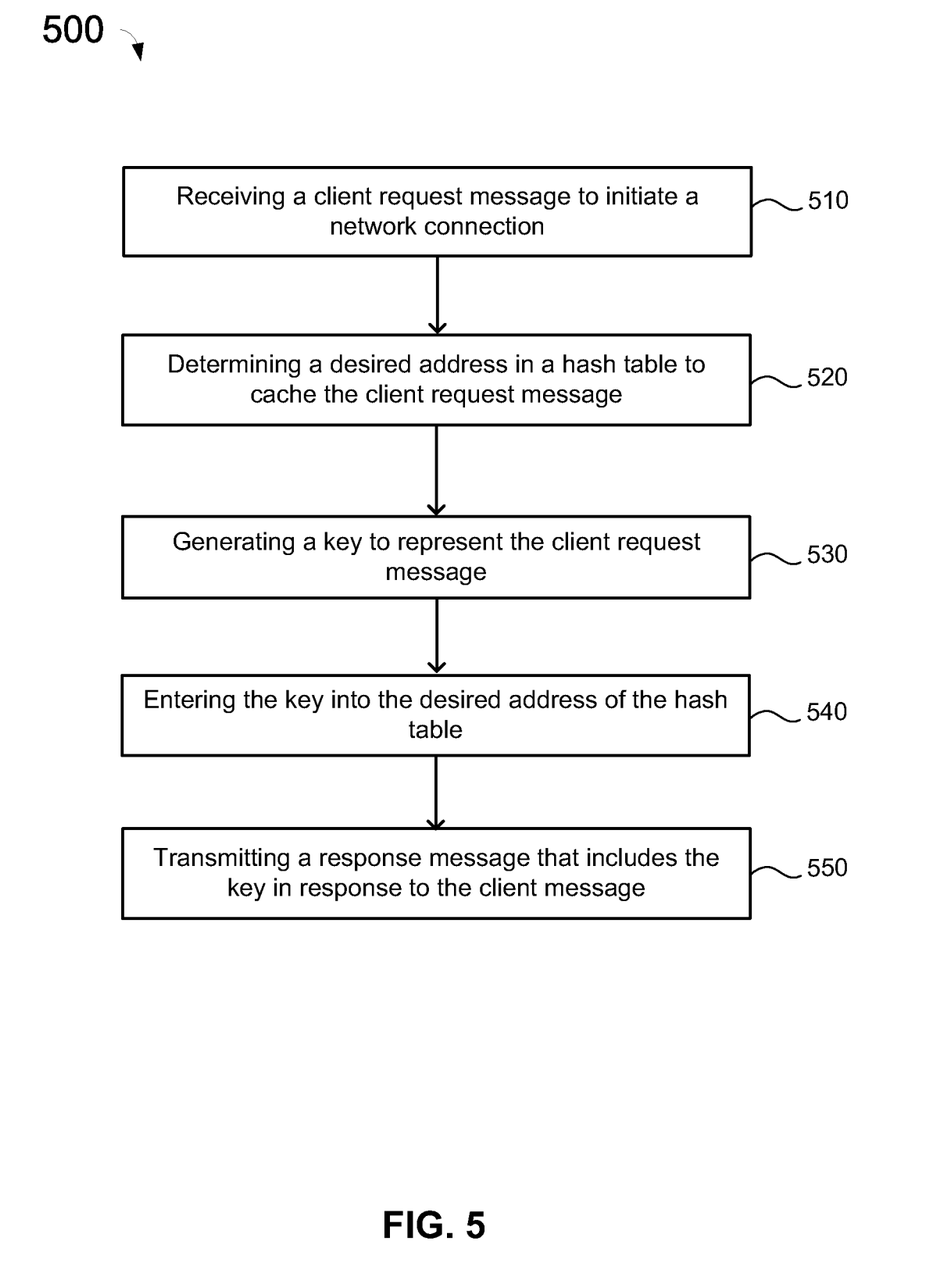
FIG. 5 depicts a simplified flowchart of a method to process a client request message to initiate a network connection according to one embodiment.

FIG. 5 depicts simplified flowchart 500 of a method to process a client request message to initiate a network connection according to one embodiment. At 510, SYN data structure manager 116 receives a client request message to initiate a network connection. In one example, the client request message is a SYN message from the TCPIP protocol.

At 520, once the request is received, SYN data structure manager 116 determines a desired address in a hash table to cache the client request message. In one example, this can be performed by data structure manager 300, independently from client information. For instance, data structure manager 300 determines the desired address by retrieving a desired address variable stored within data structure manager 300. At 530, once data structure manager 300 determines the desired address, data structure manager 300 generates a key to represent the client request message at 530. In one example, generating the synchronization key can include retrieving a count from a counter of server 110 and calculating the synchronization key based on one or more of the desired address, the count, and the number of addresses in the hash table.

At 540, once random key generator 320 generates the synchronization key, data structure manager 300 enters the synchronization key into the desired address of the hash table. In one example, data structure manager 300 can verify that the synchronization key hashes to the desired address before entering the synchronization key into the hash table. At 550, once data structure manager 300 has entered the synchronization key into the hash table, SYN data structure manager 116 can transmit a response message to client 140. The response message includes the synchronization key.

Figure 6:
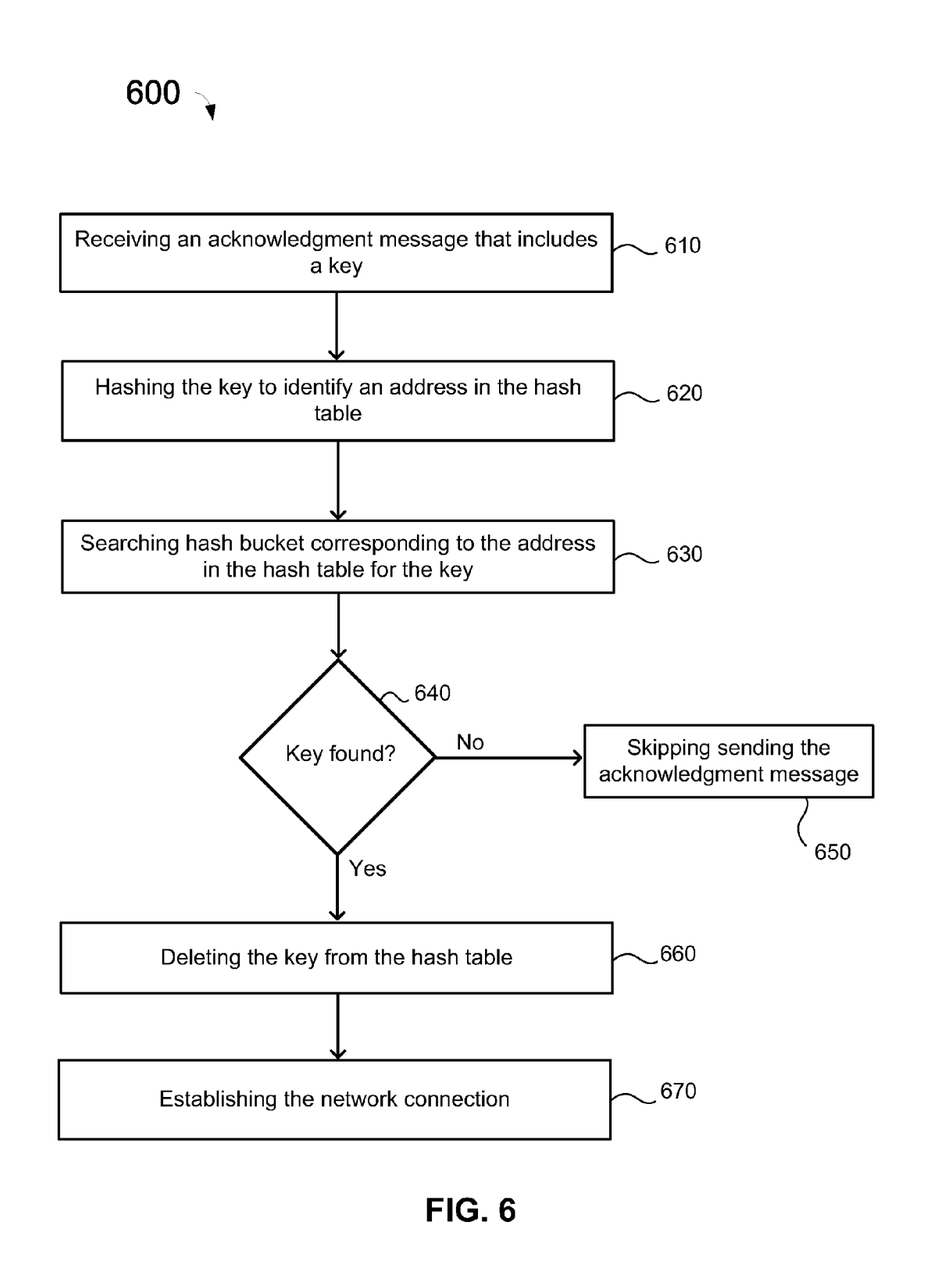
FIG. 6 depicts a simplified flowchart of a method to process a client acknowledgment message to establish a network connection according to one embodiment.

FIG. 6 depicts simplified flowchart 600 of a method to process a client acknowledgment message to establish a network connection according to one embodiment. At 610, SYN data structure manager 116 receives a client acknowledgment message to establish a network connection. The acknowledgment message includes a synchronization key. In one example, the client acknowledgment message is an ACK message from the TCPIP protocol.

At 620, once the acknowledgment message is received, data structure manager 300 hashes the synchronization key to identify an address in the hash table. At 630, once the address is hashed, data structure manager 300 searches the hash bucket corresponding to the address in the hash table for the key. At 640, if the synchronization key is not found, then data structure manager 300 skips sending the acknowledgment message at 650. If instead the synchronization key is found at 640, then data structure manager 300 deletes the synchronization key from the hash table at 660 and server 110 establishes the network connection at 670. In one example, establishing the network connection includes generating a TCP control block for the network connection.

The embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory (e.g., a flash memory device), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A computer-implemented method, comprising:
receiving, by a computer system, a client request message from a client to initiate a network connection;
determining, by the computer system, a desired bucket in a data structure used to track client request messages, the desired bucket being determined independent of information for the client, and wherein the data structure includes a plurality of buckets and each bucket includes a set of entries;
generating, by the computer system, a key to represent the client request message, wherein the key is generated independent of information for the client and is generated such that a value of the key corresponds to the desired bucket in the data structure;
entering, by the computer system, the key in an entry in the set of entries for the desired bucket in the data structure;
transmitting, by the computer system, a response message that includes the key as a server initial sequence number generated by the computer system in response to the client request message; and
upon receiving an acknowledgement from the client including the key, hashing, by the computer system, the key to identify the desired bucket in the data structure, wherein the network connection between the client and the computer system is established according to the key.

2. The computer-implemented method of claim 1, further comprising:
determining, by the computer system, the desired bucket the key corresponds to in the data structure;
deleting, by the computer system, the key from the desired bucket in the hash table when the key is found in the bucket; and
establishing, by the computer system, the network connection when the key is found at the desired bucket.

3. The computer-implemented method of claim 2, wherein deleting the key comprises:
searching, by the computer system, for the desired bucket in the data structure for the key to delete the key.

4. The computer-implemented method of claim 1, wherein independent of information for the client comprises independent of information provided in the client request message.

5. The computer-implemented method of claim 1, wherein generating the key comprises:
retrieving, by the computer system, a count from a counter of the computer system; and
calculating, by the computer system, the key based on the desired bucket, the count, and a number of buckets in the data structure.

6. The computer-implemented method of claim 1, wherein the desired bucket is determined without client direction.

7. A non-transitory computer readable storage medium containing instructions, that when executed, control a computer system to be configured for:
receiving a client request message from a client to initiate a network connection;
determining a desired bucket in a data structure used to track client request messages, the desired bucket being determined independent of information for the client, and wherein the data structure includes a plurality of buckets and each bucket includes a set of entries;
generating a key to represent the client request message, wherein the key is generated independent of information for the client and is generated such that a value of the key corresponds to the desired bucket in the data structure;
entering the key in an entry in the set of entries for the desired bucket in the data structure;
transmitting a response message that includes the key as a server initial sequence number generated by the computer system in response to the client request message; and
upon receiving an acknowledgement from the client including the key, hashing, by the computer system, the key to identify the desired bucket in the data structure, wherein the network connection between the client and the computer system is established according to the key.

8. The non-transitory computer readable storage medium of claim 7, further configured for:
determining the desired bucket the key corresponds to in the data structure;
deleting the key from the desired bucket in the hash table when the key is found in the bucket; and
establishing the network connection when the key is found at the desired bucket.

9. The non-transitory computer readable storage medium of claim 8, wherein deleting the key comprises:
searching for the bucket in the data structure for the key to delete the key.

10. The non-transitory computer readable storage medium of claim 7, wherein independent of information for the client comprises independent of information provided in the client request message.

11. The non-transitory computer readable storage medium of claim 7, wherein generating the key comprises:
retrieving a count from a counter of the computer system; and
calculating the key based on the desired bucket, the count, and a number of buckets in the data structure.

12. The non-transitory computer readable storage medium of claim 7, wherein the desired bucket is determined without client direction.

13. An apparatus, comprising:
one or more computer processors; and
a non-transitory computer-readable storage medium comprising instructions, that when executed, control the one or more computer processors to be configured for:
receiving a client request message from a client to initiate a network connection;
determining a desired bucket in a data structure used to track client request messages, the desired bucket being determined independent of information for the client, and wherein the data structure includes a plurality of buckets and each bucket includes a set of entries;
generating a key to represent the client request message, wherein the key is generated independent of information for the client and is generated such that a value of the key corresponds to the desired bucket in the data structure;
entering the key in an entry in the set of entries for the desired bucket in the data structure;
transmitting a response message that includes the key as a server initial sequence number generated by the computer system in response to the client request message; and
upon receiving an acknowledgement from the client including the key, hashing, by the computer system, the key to identify the desired bucket in the data structure, wherein the network connection between the client and the apparatus is established according to the key.

14. The apparatus of claim 13, further configured for:
determining the desired bucket the key corresponds to in the data structure;
deleting the key from the desired bucket in the hash table when the key is found in the bucket; and
establishing the network connection when the key is found at the desired bucket.

15. The apparatus of claim 14, wherein deleting the key comprises:
searching for the bucket in the data structure for the key to delete the key.

16. The apparatus of claim 13, wherein independent of information for the client comprises independent of information provided in the client request message.

17. The apparatus of claim 13, wherein generating the key comprises:
retrieving a count from a counter of the apparatus; and
calculating the key based on the desired bucket, the count, and a number of buckets in the data structure.

18. The method of claim 1, wherein each bucket comprises an address within the data structure.

19. The non-transitory computer readable storage medium of claim 7, wherein each bucket comprises an address within the data structure.

20. The apparatus of claim 13, wherein each bucket comprises an address within the data structure.

* * * * *